324-77 CROSS REFERENCE SEARCH ROOM
Aug. 1, 1967 CHU-SUN YEN 3,334,305
PHASE-LOCKED SIGNAL SAMPLING CIRCUIT
Filed March 2, 1964
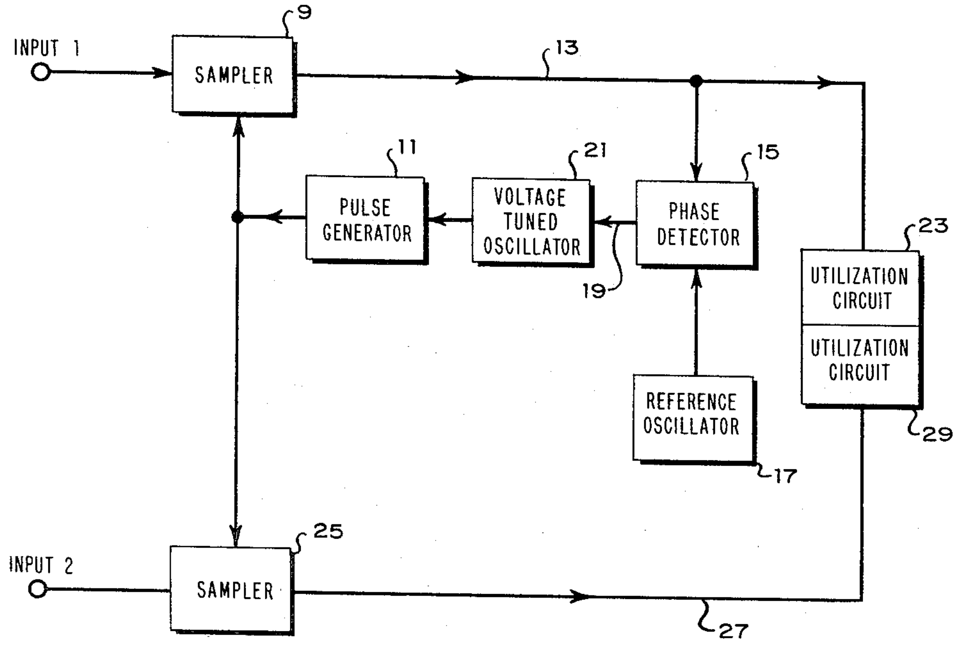
INVENTOR
CHU-SUN YEN
BY A. C. Smith
AGENT 3,334,305
Patented Aug. 1, 1967

3,334,305

PHASE-LOCKED SIGNAL SAMPLING CIRCUIT

Chu-Sun Yen, Palo Alto, Calif., assignor to Hewlett-Packard Company, Palo Alto, Calif., a corporation of California Filed Mar. 2, 1964, Ser. No. 348,675
4 Claims. (Cl. 328—151)

ABSTRACT OF THE DISCLOSURE

A sampling phase-locked circuit loop includes a phase detector which compares reference oscillations with a fundamental frequency component of variations in the amplitude of samples of an applied signal for controlling the sampling repetition rate to maintain phase-locked operation on applied signal of variable frequency.

This invention relates to a sampling circuit which produces a constant low frequency signal having the same waveform as a variable high frequency signal applied to the circuit and having signal level and phase information related to the applied high frequency signal.

It is an object of the present invention to provide a circuit which reproduces the wave shape of a high frequency input signal as a lower frequency output signal of constant frequency for all values of frequency of the input signal.

It is another object of the present invention to provide an improved sampling circuit including a phase-locked loop which reproduces the wave shape of an input signal as an output signal of constant frequency having a signal level and phase information related to the signal level of a variable high frequency input signal.

In accordance with the illustrated embodiment of the present invention a high frequency sampler such as the type described in pending U.S. patent application Ser. No. 265,767, filed on Mar. 18, 1963, by Kay B. Magleby and Wayne M. Grove, now issued as U.S. Patent No. 3,241,-076, is connected to receive an input signal of variable high frequency for producing sample pulses at a selected rate having amplitudes relates to the instantaneous amplitude of the input signal. The variations in sample pulse amplitude are compared in a phase detector with a low frequency reference signal to produce a voltage which controls the repetition rate of sample pulses. The output of the circuit is a signal having the same fixed frequency as the reference oscillator for all input signal frequencies and having the same waveform as the input signal. Harmonic components and sideband signals in the input frequency are preserved and appear in the output respectively as harmonics and sidebands of the reference oscillator frequency. A second sampler connected to produce sample pulses at the same pulse repetition rate may be used to obtain information relating to relative level and the phase shift of signals between selected points in a circuit under test.

Other and incidental objects of the present invention will be apparent from a reading of this specification and an inspection of the accompanying drawing which shows a block diagram of the circuit of the present invention.

In the drawing, a first sampler 9 is connected to receive an input signal (having a frequency typically of the order of one kilomegacycles per second) and a train of pulses from pulse generator 11. Sampler 9 produces sample pulses on line 13 having a repetition rate related to the repetition rate of pulses from generator 11 and having amplitudes which vary as the instantaneous amplitude of the input signal varies at each sample instant. This variation of sample pulse amplitude is compared in phase detector 15 with the output of reference oscillator 17. Detector 15 produces a control voltage on line 19 which is proportional to the phase relationship between the reference frequency and the fundamental component of variations in sample pulse amplitude. This control voltage is applied to the voltage-tuned oscillator 21 to vary the frequency of its output, which output is applied to pulse generator 11 to vary the repetition rate of pulses applied to the sampler 9. Phase lock is thus maintained between the reference oscillator 17 and the fundamental component of amplitude variations of the sample pulses produced by sampler 9 in response to pulses applied thereto from generator 11. The output of the phase-locked loop appears on line 13 as a fixed frequency signal which is applied to utilization circuit 23. The present circuit preserves the information about harmonics and sidebands of the input signal by reproducing on output line 13 the harmonics and sidebands of the reference oscillator 17 at related amplitudes. This circuit may thus be used to measure high frequency signal voltages where the input level is sufficiently high (say above 1 millivolt) to permit phase locked operation of the circuit.

A second sampler 25 may be included where the circuit is used as a high frequency phase meter or high sensitivity voltmeter. This sampler 25 is connected to receive the pulses from generator 11 to produce sample pulses on its output line 27 having amplitudes which vary as the instantaneous amplitude of the input signal applied thereto varies at each sample instant. These sample pulses are applied to utilization circuit 29. In practice, the utilization circuits 23 and 29 may include low pass filters for rejecting frequencies above a selected harmonic of reference oscillator 17. These circuits 23 and 29 may also include a circuit which combines the fixed frequency component on the output lines 13 and 27 to provide an indication of the relative phase angle between signals at the inputs 1 and 2 and may also include a circuit which provides an indication of the signal level, harmonics, distortion, and amplitude modulation present in the signal at one (or both) of the inputs. When so arranged, the present circuit provides phase and amplitude information about signals present at selected points in a circuit under test. The phase-locked loop including sampler 9 may also be attached to a circuit point of high signal level to phase lock the loop while the circuit including sampler 25 is used to measure low-level signal voltages (say about 10 microvolts) in a circuit under test.

I claim:

1. A signalling circuit comprising:
a first source of trigger pulses;
a sampler connected to receive an input signal and the trigger pulses from said first source for producing an output pulse having an amplitude related to the amplitude of the input signal at each occurrence of a trigger pulse;
a second source of reference frequency;
means connected to the second source and to the output of the sampler for producing a control signal related to the phase relationship between the reference frequency and the selected frequency component of the variations in output pulse amplitude; and
means connected to apply said control signal to said first source for altering the repetition rate of said trigger pulses.

2. A signalling circuit comprising:
a first source of trigger pulses;
a sampler connected to receive an input signal and the trigger pulses from said first source for producing an output pulse having an amplitude related to the amplitude of the input signal at each occurrence of a trigger pulse;
a second source of reference frequency;

a phase detector connected to receive the output pulses and the reference frequency for producing a control signal related to the phase relationship between the reference frequency and a selected frequency component of the variations in output pulse amplitude;

means connected to apply said control signal to said first source for altering the repetition rate of said trigger pulses; and means connected to receive the output pulses for providing an indication of the value of a selected parameter of said selected frequency component.

3. A signalling circuit comprising:

a first source of trigger pulses;

a first sampler connected to receive an input signal and the trigger pulses from said first source for producing an output pulse having an amplitude related to the amplitude of the input signal at each occurrence of trigger pulse;

a second source of reference frequency;

means connected to the second source and to the output of the first sampler for producing a control signal related to the phase relationship between the reference frequency and the fundamental frequency component of the variations in output pulse amplitude;

means connected to apply said control signal to said first source for altering the repetition rate of said trigger pulses;

a second sampler connected to receive an input signal and the trigger pulses from said first source for producing an output pulse having an amplitude related to the amplitude of the input signal applied to the second sampler at each occurrence of a trigger pulse; and a utilization circuit connected to one of said samplers for providing an indication of the value of a selected parameter of the signal at the output of said one of the samplers.

4. A signalling circuit as in claim 3 wherein:

the utilization circuit is connected to each of said samplers for providing an indication of the value of a selected parameter of a combination of the signals at the outputs of said samplers.

References Cited

UNITED STATES PATENTS

| | | | |
|---|---|---|---|
| 2,885,553 | 5/1959 | Albro et al. | 328—25 |
| 3,122,704 | 2/1964 | Jones | 324—85 |
| 3,205,454 | 9/1965 | Lowe | 328—151 |

ARTHUR GAUSS, *Primary Examiner.*

R. H. EPSTEIN, *Assistant Examiner.*